US012394229B1

(12) United States Patent
Okun et al.

(10) Patent No.: US 12,394,229 B1
(45) Date of Patent: Aug. 19, 2025

(54) SYSTEM AND METHOD FOR PROCESSING IMAGES TO BE UPLOADED TO A SERVER

(71) Applicant: Charles Schwab & Co., Inc., San Francisco, CA (US)

(72) Inventors: David Okun, Austin, TX (US); Amy L. Acuff, Austin, TX (US); Charles E. Gotlieb, San Juan, PR (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 156 days.

(21) Appl. No.: 17/402,488

(22) Filed: Aug. 13, 2021

Related U.S. Application Data

(60) Provisional application No. 63/065,416, filed on Aug. 13, 2020.

(51) Int. Cl.
*G06V 30/14* (2022.01)
*G06V 10/12* (2022.01)
*G06V 30/146* (2022.01)

(52) U.S. Cl.
CPC .......... *G06V 30/1444* (2022.01); *G06V 10/12* (2022.01); *G06V 30/146* (2022.01); *G06V 2201/01* (2022.01)

(58) Field of Classification Search
CPC .. G06V 30/1444; G06V 10/12; G06V 30/146; G06V 2201/01
See application file for complete search history.

(56) References Cited

U.S. PATENT DOCUMENTS

| | | | |
|---|---|---|---|
| 9,208,550 B2 | 12/2015 | Chen et al. | |
| 10,791,272 B1* | 9/2020 | Kunjachan | H04N 23/683 |
| 2004/0012679 A1 | 1/2004 | Fan | |
| 2009/0175537 A1 | 7/2009 | Tribelhorn et al. | |
| 2010/0231732 A1* | 9/2010 | Baxansky | H04N 23/6811 348/208.4 |
| 2010/0239166 A1 | 9/2010 | Zhang et al. | |
| 2011/0292997 A1* | 12/2011 | An | H04N 19/124 375/E7.125 |
| 2012/0224072 A1* | 9/2012 | Koo | G06V 30/142 348/208.99 |
| 2013/0120595 A1* | 5/2013 | Roach | G06V 30/162 348/207.1 |
| 2013/0124414 A1 | 5/2013 | Roach et al. | |
| 2013/0297353 A1* | 11/2013 | Strange | G06Q 40/08 705/4 |

(Continued)

FOREIGN PATENT DOCUMENTS

| | | | | |
|---|---|---|---|---|
| CN | 108961005 A | * | 12/2018 | ......... G06Q 30/0631 |
| WO | WO-2020054584 A1 | * | 3/2020 | ........... G06T 3/4038 |

OTHER PUBLICATIONS

Non-Final Office Action issued Jan. 9, 2020 in U.S. Appl. No. 15/994,956.

(Continued)

*Primary Examiner* — Roberto Velez
*Assistant Examiner* — Daniella M. DiGuglielmo
(74) *Attorney, Agent, or Firm* — Harness, Dickey & Pierce, P.L.C.

(57) ABSTRACT

A system and method selects an image from multiple images taken at nearly the same time, based on blur, contour value or an estimate of either or both of these derived from the accelerometer of the device that captured the images, and then uploads the selected image.

21 Claims, 3 Drawing Sheets

(56) References Cited

U.S. PATENT DOCUMENTS

| | | | |
|---|---|---|---|
| 2014/0152849 A1* | 6/2014 | Bala | H04N 23/80 348/207.1 |
| 2014/0270329 A1 | 9/2014 | Rowley et al. | |
| 2015/0054975 A1* | 2/2015 | Emmett | H04N 23/667 348/220.1 |
| 2016/0094801 A1* | 3/2016 | Beysserie | H04N 5/915 386/226 |
| 2020/0267314 A1* | 8/2020 | Sivan | H05K 999/99 |

OTHER PUBLICATIONS

Notice of Allowance issued Jun. 25, 2020 in U.S. Appl. No. 15/994,956.

* cited by examiner

SYSTEM AND METHOD FOR PROCESSING IMAGES TO BE UPLOADED TO A SERVER

RELATED APPLICATIONS

This application claims the benefit of, U.S. Provisional patent application Ser. No. 63/065,416 entitled, "Method and Apparatus for Processing Images To Be Uploaded to a Server," filed on Aug. 13, 2020 by David Okun, Amy Acuff and Charles Gotlieb, and is related to U.S. Patent Application Ser. No. 15/994,956 entitled, "System and Method for Capturing By a Device An Image of a Light Colored Object on a Light Colored Background for Uploading to a Remote Server" Filed by Amy Lynn Acuff on May 31, 2018, each having the same assignee as the present invention and each is hereby incorporated by reference in its entirety.

FIELD OF THE INVENTION

The present invention is related to computer hardware and software and more specifically to computer hardware and software for image processing.

BACKGROUND OF THE INVENTION

Images may be processed on a remote device and uploaded to a server. If the server will perform optical character recognition, an image that is too blurry and/or not sharp may not be properly recognized by the server. Current methods of image processing are suboptimal for this purpose. What is needed is a system and method that can provide images to a server with a low level of blurriness and/or adequate level of sharpness without requiring the user to perform several attempts at capturing an image with a threshold level of clarity.

SUMMARY OF INVENTION

A system and method quickly and successively captures, on a device that is remote from a server, several images of an object to be recognized by the server, identifies or predicts the least blurry image or one with the highest or most optimal contour level, checks the image to determine if the image meets threshold levels of acceptability, and then, if the threshold levels are met, uploads the image to the server for recognition. The least blurry image and/or one with the highest contour level may be identified by calculating a blur value of some or all of the objects in the image, a countour value of some or all of the objects in the image, or both.

In another embodiment, the accelerometer system of the image-capturing device is used to predict the blur and/or contour value or to narrow the number of images for which the blur and/or contour value is identified. Images taken when the accelerometer system indicates the least amount of movement and/or acceleration, are predicted to have a lower blur and/or more optimal contour value than images taken when the accelerometer system indicates a greater degree of movement and/or acceleration as the image is being captured. A lower amount of blur and/or less optimal contour value may be indicated by the accelerometer system when the accelerometer system indicates that the image-capturing device is changing direction to an approximate opposing direction, for example.

DETAILED DESCRIPTION OF A PREFERRED EMBODIMENT

Figure 1:
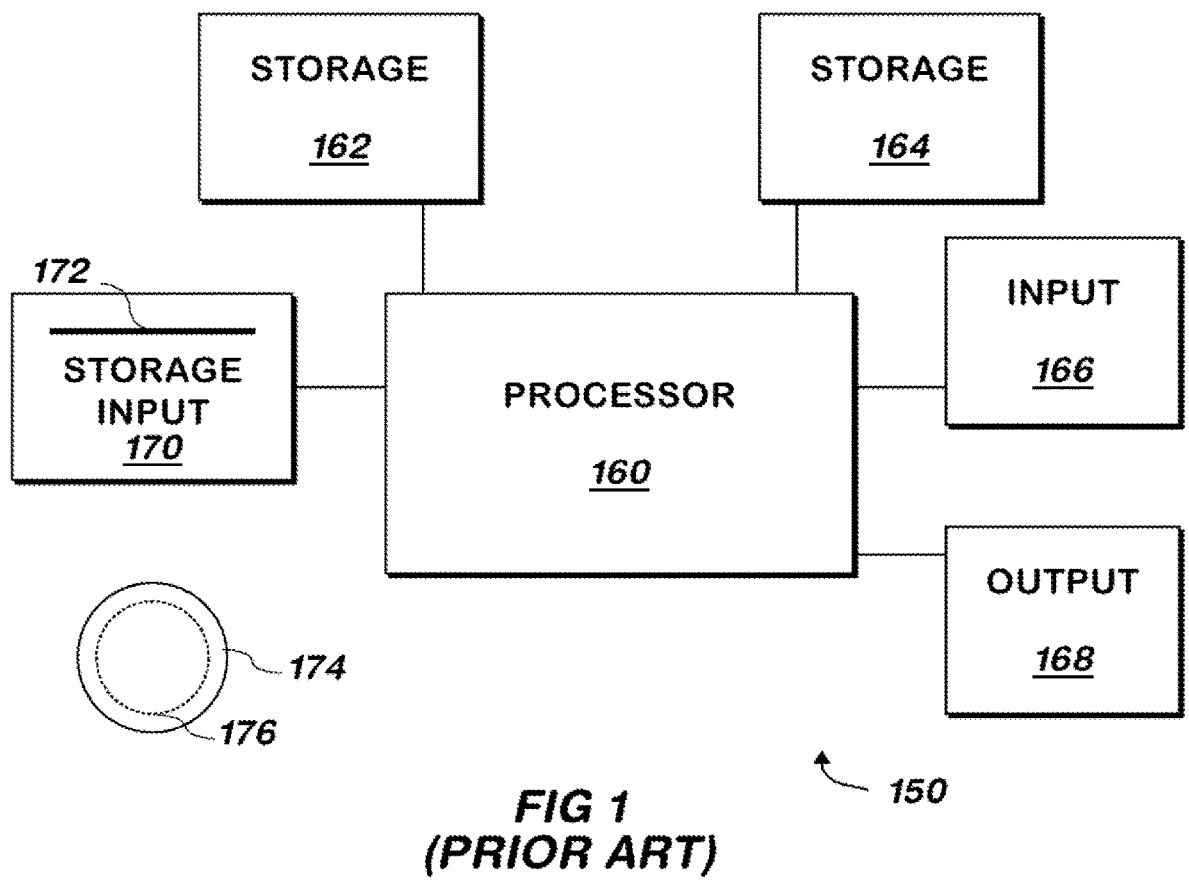
FIG. 1 is a block schematic diagram of a conventional computer system.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile (i.e. non-transitory) storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. Other system elements may include a conventional processor.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional ORACLE SERVER X8-8 running the ORACLE SOLARIS 11 or higher operating system commercially available from ORACLE CORPORATION of Redwood Shores, California, a Core i9-compatible personal computer system such as are available from DELL COMPUTER CORPORATION of Round Rock, Texas running a version of the WINDOWS operating system (such as WINDOWS 10) commercially available from MICROSOFT Corporation of Redmond Washington or a Macbook Pro computer system running the OS X or MACOS operating system commercially available from APPLE INCORPORATED of Cupertino, California and the FIREFOX browser commercially available from MOZILLA FOUNDATION of Mountain View, California or MICROSOFT EDGE browser commercially available from MICROSOFT above, although other systems may be used. Each computer system 150 may be a SAMSUNG GALAXY S10 commercially available from SAMSUNG ELECTRONICS GLOBAL of Seoul, South Korea running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Figure 2:
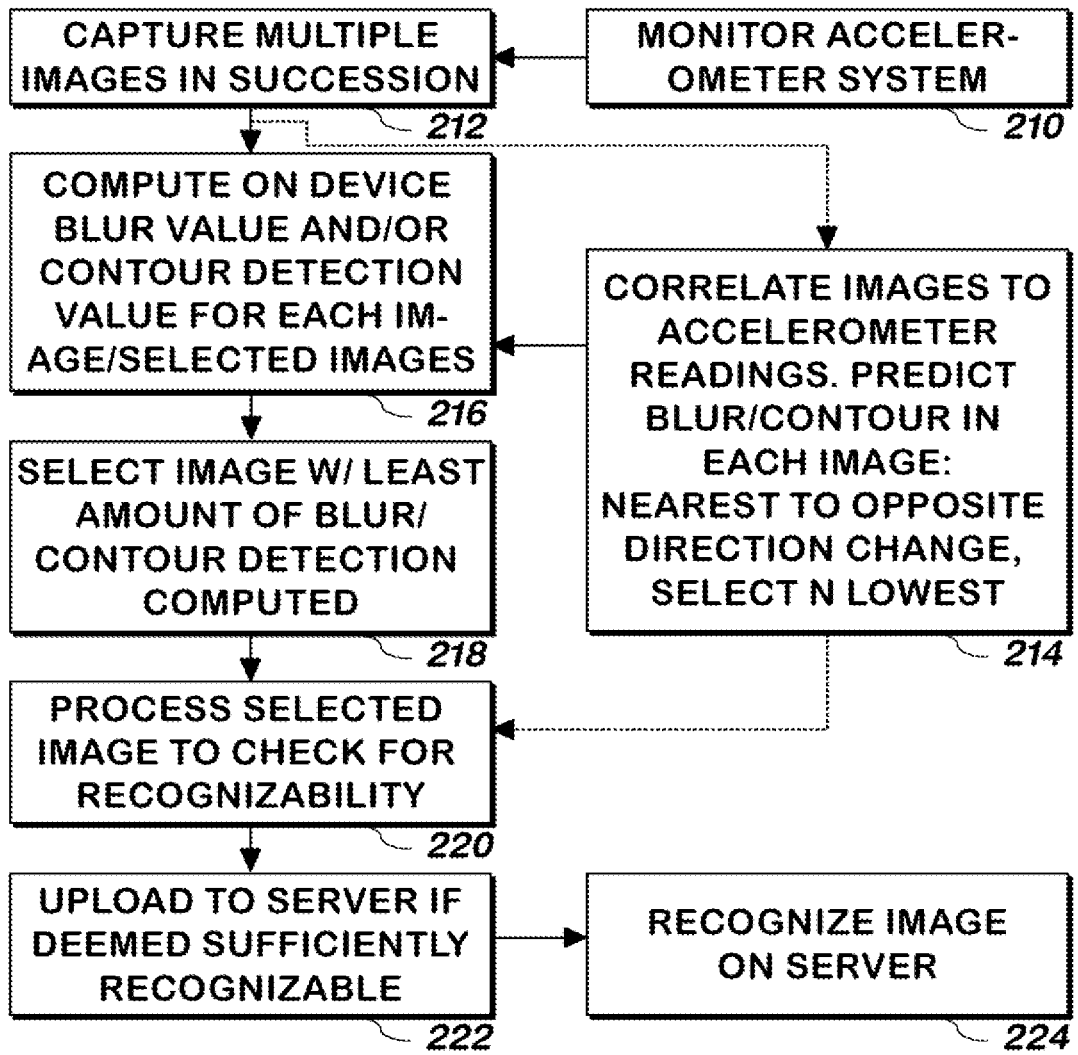
FIG. 2 is a flowchart illustrating a method of uploading an image of an object to a server for recognition, according to one embodiment of the present invention.

Referring now to FIG. 2, a method of selecting an image for uploading from a device with an integrated camera, such as a mobile device, to a server is shown according to one embodiment of the present invention. Multiple images are captured in succession, one after the other 212 by a camera on the device, in response to a user's request to capture a single image. In one embodiment, such images are captured as quickly, or approximately as quickly, as the camera can capture and record images in succession, or by capturing from a video feed sourced by the camera. In another embodiment, one or more images are captured, starting when the accelerometer system indicates that the camera is decelerating, or a short time afterwards. In one embodiment, the images may be images of a single check that is to be uploaded to a server to be recognized using conventional optical character recognition. In one embodiment, the images are time and date stamped as they are captured, with the time and date corresponding to when the image was being captured by the camera, which may be slightly before the current time of capture.

In one embodiment, a blur value and/or contour detection value for each image is computed 216 on the device on which the images were captured.

The blur value for each image may be calculated for some, or all, of the image. If some of the image is used, one or more portions of the image may be used to calculate a blur value for each portion, and the minimum blur value may be used or an average may be used, or a weighted average may be used, with the weighting in proportion to the size of each portion. In one embodiment, to calculate the blur value or each blur value, a conventional Fast Fourier Transform may be used to convert the image in one dimension, or each of two dimensions, into a representation of the frequencies in such dimension or dimensions and the blur value is assigned to represent the relative values of the transform result at higher frequencies, excluding the highest frequencies in one embodiment, compared to the transform result of the lower frequencies (for example, the average value of such lower frequencies). A high blur value indicates the upper frequencies have, on average, a lower transform result than the lower frequencies.

In one embodiment, the variation of the Laplacian technique of Pech-Pecheco et al is used to compute the blue value.

The contour detection value of each image may be computed for some or all of the image, and the some of the image may be the same some of the image used for calculating the blur value or a different some of the image, optionally with portions of each some of the image used to compute the blur value and the some of the image used to compute the contour detection value, overlapping one another. Each some or all of the image used to compute the contour detection value may be selected to include portions of the image known to have lines or text, which may be identified via conventional threshold or canny edge detection.

Contour detection values may be computed using the OPENCD vision framework of the IOS library commercially available from APPLE COMPUTER CORPORATION of Cupertino, California, and this framework may also be used to compute blur values. A high contour detection value may be indicated by one with a combination of the greatest total area of contours detected in the smallest number of individual contours, or using other conventional techniques. Different areas of the image may be used for contour detection, and the average or weighted average of each area (as described above) may be used as the countour value of the image.

The image with the least amount of blur as indicated by the blur value computed, contour, as indicated by the contour detection value computed, or a combination of both, is selected 218 and the selected image or an image created from this image is processed 220 as described in the related application to ensure that it meets certain standards for recognizability. The related application discusses checking for a minimum acceptable blur score after other checks have been made, however, the blur score may be checked first, because it is available from the above processing.

In the embodiment in which a combination of the blur value and contour detection value is used, each of these values may be weighted and summed. The weights may be identified by testing dozens or hundreds of images that are at least similar to the type of image that will be processed to identify weightings that predict recognition accuracy as determined by a manual check of the recognition. For example, if the types of images will be images of checks, multiple images of multiple different checks may be used as described above, with a variety of combinations of weights for each value, and each image is recognized using machine recognition as described herein and the related application, and then manually checked for accuracy. The combination of weights that were used for the image or images that produced the highest accuracy are then used to create the sum for subsequent checks processed as described herein.

The image is uploaded to the server for recognition if the standards are met 222 and the server then recognizes 224 characters on the image using conventional optical character recognition techniques.

Optional Use of Accelerometer

In one embodiment, while the images are captured as described above, an accelerometer system is optionally monitored 210 to identify movements of the device that is used to capture multiple images of the same object, as described herein. Such device may include a conventional smart device, such as a tablet or phone, with an integrated camera and accelerometer. Monitoring the accelerometer system may include recording a series of periodic readings of the accelerometer in each of 3 dimensions during the times the images are captured by the camera to allow detection of direction changes, acceleration and deceleration and the time of such events, or by recording accelerometer readings at certain times, such as very shortly before, and very shortly after, each of the images are taken in step 212. In one embodiment, two accelerometer readings are recorded, before and after each image is captured, and both are used for the image. The accelerometer recorded after one image may be used as the accelerometer recorded before the next image, or two different readings may be used instead.

In one embodiment, before the blur values and/or contour values are identified, or instead of identifying the blur values and/or contour values, the images captured in step 212 are correlated 214 with the accelerometer readings, for example, by using the timestamps of each, and optionally, any delays between them, or by storing them in an order that allows accelerometer readings recorded around the same time or in the same order of the images to be matched with the image.

The blur value and/or contour value of each image is predicted 214 based on one or more accelerometer readings, such as the one or two correlated with the image and optionally, other readings. The predictions may be relative to one another, without predicting an actual value, with images corresponding to higher acceleration as indicated by the accelerometer values predicted to have higher blur and lower countour values, and in the case of two readings correlated with each image, those that are increasing predicted to have higher blur and/or lower countour values than those that are decreasing, and those associated with a change in direction having the lowest blur and highest contour values.

As used herein, an "accelerometer" is any component of a smart device that can measure movement of any kind, and thus the term may encompass gyroscopes, magnetometers and the like, as well as a conventional accelerometer.

In one embodiment, the N images with the lowest predicted blur values and/or best predicted contour values are selected as part of step 216 and the blur values and/or contour values of only the selected images are computed using the selected images in step 216, with N being fewer than all of the images, and thus the predicted values are used to filter the images so as to reduce the number of blur and/or contour values identified. The non selected images are not used to calculate blur values or contour values, in one embodiment. Processing then continues for step 216 as described above using the selected images, thus saving calculation of blur values for images predicted to have blur values indicating the higher blur.

In another embodiment N is one, and so the one selected image of step 214 is the selected image processed in step 220, bypassing steps 216 and 218 altogether.

Images of any type of object may be used according to the present invention, which is not just limited to checks. Any number of images, such as three, or five or ten may be captured of the same object, as described herein. Any number of objects of the same or different type may be used as the object of the images captured.

The present invention reduces the number of images that cannot be successfully machine recognized, for example, after they are uploaded to a server, thus reducing uploading operations on the uploading device if the image is unrecognizeable, network bandwidth and server operations that attempt to recognize an image that is unrecognizable or provides poor recognition accuracy and/or increased computing resources to recognize, making the system more efficient and more successful at recognition.

System.

Figure 3:
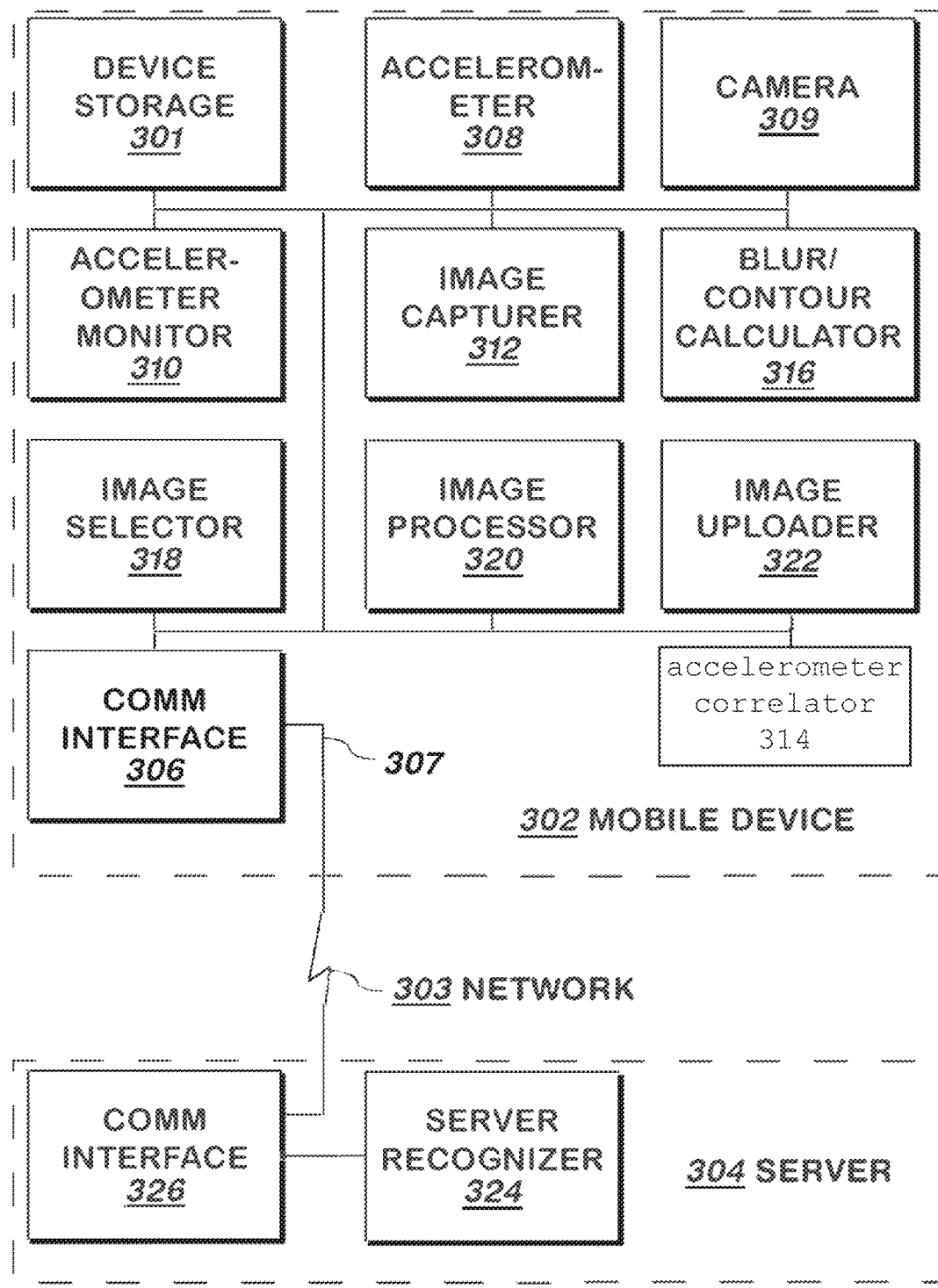
FIG. 3 is a block schematic diagram of a system for uploading an image of an object to a server for recognition according to one embodiment of the present invention.

Referring now to FIG. 3, a system for uploading images to a server, where the images may be recognized by the server, is shown according to one embodiment of the present invention. Mobile device 302 includes a conventional mobile device such as a mobile telephone or tablet, and includes accelerometer 308 and camera 309. Mobile device 302 includes communication interface 306, which may include a conventional TCP/IP communication interface running suitable communication protocols, such as Ethernet, TCP/IP, or both. Mobile device 302 is coupled to server 304 via network 303, which may include a conventional Ethernet network, conventional telecommunications networks, such as conventional cellular telephone communication networks, and the networks that make up the Internet. Mobile device 302 communicates with server 304 via input/output 307 of communication interface 306. Server 304 is a conventional computer system with its own TCP/IP communication interface 326, similar to that described above, that is used to communicate with mobile device 302. Although only one mobile device 302 is shown in the Figure, any number of mobile devices 302 may operate as described herein using server 304.

Mobile device 302 may be instructed to capture an image, for example by the user holding a camera above the subject of the image until a subject of suitable dimensions is identified, or the user may press a button or other user interface element to indicate that the image should be captured. Upon the occurrence of any such event, image capturer 312 is signaled.

When signaled, image capturer 312 signals accelerometer monitor 310 which records readings from accelerometer 308 into device storage 301, associated with the timestamp of each of the readings, or a set of the readings corresponding to the time of the timestamp. Simultaneously with the capturing of the accelerometer readings, image capturer 312 captures multiple images of the subject in succession. In one embodiment, to capture multiple images in succession, image capturer 312 captures images as fast as they can be captured and stored into device storage 301. Device storage 301 includes a conventional memory. Image capturer 312 stores the images into device storage 301 associated with a unique identifier it assigns, associated with the timestamp corresponding to when the image was captured. The timestamps retrieved by image capturer 312 and accelerometer 308 may be retrieved from an operating system that is not shown in the Figure. When image capturer 312 has completed capturing multiple images in succession, for example capturing eight images in succession, or 20 images in succession, or 50 images in succession, image capturer 312 signals blur/contour calculator 316, and/or accelerometer correlator 314.

When signaled, accelerometer correlator 314 correlates the images to the accelerometor readings by locating the accelerometer readings having a timestamp nearest in time to the timestamp of each of the images, and may associate the accelerometer readings with their correlated image in device storage 301. Accelerometer correlator 314 predicts the blur/contour detection value of each image using the correlated accelerometer reading as described above and stores such predicted values into device storage 301 associated with the image for which the blur or contoured detection value was predicted. Accelerometer correlator 314 may signal blur/contour calculator 316, after it selects a subset of the images predicted to have the lowest blur/contour detection values and marks the selected images in device storage 301 or may signal image processor 320 with an identifier of the image having the lowest predicted blur and/or contour detection value once the blur/contour values of each image are predicted as described above.

When signaled, blur/contour calculator 316 computes, as described above using conventional techniques, a blur value and/or contour detection value for each image, or for the images selected by accelerometer correlator 314.

Blur/contour calculator 316 stores the blur and/or contour detection values for each image into device storage 301 associated with the corresponding image. When blur/contour calculator 316 has completed computing the blur and/or contour detection values for each image, or for the selected images, blur/contour calculator 316 signals image selector 318.

When signaled, image selector 318 selects the image with the least amount of blur/contour detection computed and provides the identifier of the selected image to image processor 320.

When it receives an identifier of an image, image processor 320 processes the image corresponding to the identifier in device storage 301 to identify whether the image meets a sufficient threshold of recognizability, as described above. If image processor 320 determines that such threshold has not been met, image processor 320 signals image capturer 312, which may repeat the process, or may signal a user interface element to indicate to the user to hold the mobile device 302 to more steady, which itself then repeats the process described herein. If image processor 320 determines that the threshold of recognizability has been met, image processor 320 provides the identifier of the image to image uploader 322, which uploads the image to server recognizer 324 of server 304, along with a user identifier or session identifier that is determined using conventional techniques. Server recognizer 324, performs conventional optical character recognition of the image it receives, and provides the characters recognized at an output for further processing.

Each system element may include a conventional hardware processor or hardware processor system or processor system or processor that is coupled to a hardware memory or hardware memory system or memory or memory system, each of these being conventional in nature. The processor is specially programmed to operate as described herein. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. System elements are coupled to one another to perform the functions described herein and may utilize data obtained in any possible manner.

Certain Embodiments.

Described is a method of uploading at least one of two or more images from a mobile device to a server, including:
  recording readings from an accelerometer of the mobile device while capturing in computer memory of the mobile device two or more images of a subject using a camera of the mobile device;
  predicting at least one blur or contour value for each of the two or more images responsive to the readings recorded;
  selecting the at least one of the two or more images responsive to the at at least one blur or contour value; and
  uploading to the server from the mobile device the at least one of the two or more images selected.

The method may contain additional features whereby the at least one of the two or more images is uploaded to the server responsive to a check of each of the at least one image for recognizability.

The method may additionally include performing optical character recognition on the image at the server.

The method may contain additional features whereby at least all but one of the two or more images are captured by the mobile device automatically, without a user doing anything more than is required to capture one of the two or more images.

The method may contain additional features whereby the at least one of the blur or contour value comprises a blur value.

The method may contain additional features whereby the at least one of the blur or contour value comprises a contour value.

The method may additionally include correlating a subset of the readings from the accelerometer with different ones of the two or more images.

Described is a system for uploading at least one of two or more images from a mobile device to a server, including:
  an accelerometer monitor at the mobile device having an input for receiving readings from an accelerometer of the mobile device coupled to the accelerometer input, the accelerometer monitor for providing the readings from the accelerometer at an output;
  an image capturer at the mobile device having an input for receiving two or more images of a subject using a camera of the mobile device as the accelerometer monitor is receiving the readings, the image capturer for providing at an output the two or more images;
  a blur/contour calculator at the mobile device having an input coupled to the accelerometer monitor output for receiving the readings, for predicting at least one blur or contour value for each of the two or more images responsive to the readings recorded, and for providing at an output the at least one blur or contour value for each of the images in the plurality;
  an image selector having an input coupled to the accelerometer correlator output for receiving the at least one blur or contour value for each of the images in the plurality, the image selector for selecting the at least one of the two or more images responsive to the at at least one blur or contour value and for providing at an output an identifier of each of the at least one of the two or more images selected; and
  an image uploader at the mobile device having an input coupled to the image capturer output for receiving at least the images corresponding to the identifier of each of the at least one of the two or more images selected, the image uploader for uploading to the server from the mobile device the at least one of the two or more images selected.

The system may additionally include an image processor having an input coupled to the image selector output for receiving the identifier of the at least one of the two or more images, and to the image capturer output for receiving at least the images corresponding to each identifier of the at least one of the two or more images, the image processor for performing a check for recognizability of at least one of the at least one image, and for providing at an output an identifier of each of the at least one image checked that is determined to be recognizable; and
  may contain additional features whereby the image uploader input is additionally coupled to the image processor output for receiving the identifier of each of the at least one image checked that is determined to be recognizable, and the image uploader uploads the at least one of the two or more images responsive to the identifier of at least one image checked that is determined to be recognizable.

The system may additionally include a server recognizer at the server having an input coupled to the image uploader output for receiving the at least one of the two or more images uploaded, he server recognizer for performing optical character recognition on the image at the server and for providing at an output at least one character recognized.

The system may contain additional features whereby at least all but one of the two or more images are captured by the image capturer automatically, without a user doing anything more than is required to capture one of the two or more images.

The system may contain additional features whereby the at least one of the blur or contour value comprises a blur value.

The system may contain additional features whereby the at least one of the blur or contour value comprises a contour value.

The system:
may additionally include an accelerometer correlator having an input coupled to the accelerometer monitor output for receiving the readings from the accelerometer, and two or more timestamps of the readings generated by the accelerometer monitor, and to the image capturer output for receiving a timestamp for each of the two or more images, said timestamp generated by the image capturer indicating a point corresponding to when the image was captured, the accelerometer correlator for correlating a subset of the readings from the accelerometer with different ones of the two or more images, and providing at an output coupled to the blur/contour calculator input the subset of the readings and identifiers of the images to which the subset of the readings are correlated;

and may contain additional features whereby the blur/contour calculator predicts the at least one blur or contour value for each of the two or more images additionally responsive to the identifiers of the images to which the subset of the readings are correlated.

Described is a computer program product computer program product including a nontransitory computer useable medium having computer readable program code embodied therein for uploading at least one of two or more images from a mobile device to a server, the computer program product including the computer program product including computer readable program code devices configured to cause a computer system to:
record readings from an accelerometer of the mobile device while capturing in computer memory of the mobile device two or more images of a subject using a camera of the mobile device;
predict at least one blur or contour value for each of the two or more images responsive to the readings recorded;
select at least one of the two or more images responsive to the at at least one blur or contour value; and
upload to the server from the mobile device the at least one of the two or more images selected.

The computer program product may contain additional features whereby the at least one of the two or more images is uploaded to the server responsive to a check of each of the at least one image for recognizability.

The computer program product of claim Described is may additionally include computer program product including computer readable program code devices configured to cause a computer system to perform optical character recognition on the image at the server.

The computer program product may contain additional features whereby at least all but one of the two or more images are captured by the mobile device automatically, without a user doing anything more than is required to capture one of the two or more images.

The computer program product may contain additional features whereby the at least one of the blur or contour value comprises a blur value.

The computer program product may contain additional features whereby the at least one of the blur or contour value comprises a contour value.

The computer program product may additionally include computer readable program code devices configured to cause a computer system to correlate a subset of the readings from the accelerometer with different ones of the two or more images.

What is claimed is:

1. A method of uploading at least one of a plurality of images of a subject from a mobile device to a server, the method comprising:
 recording readings of acceleration from an accelerometer of the mobile device while capturing the plurality of images of the subject in succession in a burst using a camera of the mobile device;
 mapping the readings of the acceleration from the accelerometer with respective ones of the plurality of images of the subject by correlating timestamps associated with the plurality of images of the subject with timestamps associated with the readings of the acceleration from the accelerometer;
 narrowing which of the plurality of images to perform a blur analysis on by predicting which of the plurality of images of the subject are least likely blurred images or low contoured images after capturing the burst of the plurality of images based on the mapping of the readings of the acceleration recorded at the timestamps associated with the respective ones of the plurality of images of the subject by,
  determining which of the readings of acceleration from the accelerometer are a lowest reading of acceleration after capturing the burst of the plurality of images,
  determining the timestamp associated with the lowest reading of acceleration, and
  determining the least likely blurred images or the low contoured images as ones of the plurality of images having a same timestamp as the timestamp associated with the lowest reading of acceleration;
 checking only the least likely blurred images or the low contoured images for recognizability from among the plurality of images by performing the blur analysis on only the least likely blurred images or the low contoured images among the plurality of images to generate a blur value and comparing the blur value with a threshold selected based on a maximum amount of blur that can be reliably recognized via optical character recognition (OCR); and
 selectively uploading the least likely blurred images or the low contoured images of the subject to the server based on results of the checking such that only a subset of the plurality of images captured by the mobile device during the burst are uploaded to the server for the server to perform the OCR thereon.

2. The method of claim 1, wherein at least all but one of the plurality of images are captured by the mobile device automatically, without a user doing anything more than is required to capture one of the plurality of images.

3. The method of claim 1, wherein the predicting predicts which of the plurality of images are the least likely blurred images.

4. The method of claim 1, wherein the predicting predicts which of the plurality of images are the low contoured images.

5. The method of claim 1, wherein the predicting which of the plurality of images of the subject are the least likely blurred images or the low contoured images is based on the readings of the acceleration from the accelerometer, and the checking by performing the blur analysis is performed subsequent to the predicting of the least likely blurred images or low contoured images and is based on transforming the least likely blurred images or the low contoured images to a frequency domain.

6. The method of claim 5, wherein the transforming the least likely blurred images or the low contoured images to the frequency domain utilizes a Fast Fourier Transform (FFT).

7. The method of claim 1, wherein the mobile device is configured to perform a two-step process with the predicting being a first step of the two-step process performed on the plurality of images and the checking being a second step of the two-step process by performing the blur analysis on the least likely blurred images or the low contoured images, which are the subset of the plurality of images.

8. A system for uploading at least one of a plurality of images of a subject from a mobile device to a server, comprising:
a memory and a processor, the memory storing a computer readable code that, when executed by the processor, configures the system to,
record readings of acceleration from an accelerometer of the mobile device while capturing the plurality of images of the subject in succession in a burst using a camera of the mobile device;
map the readings of the acceleration from the accelerometer with respective ones of the plurality of images of the subject by correlating timestamps associated with the plurality of images of the subject with timestamps associated with the readings of the acceleration from the accelerometer;
narrow which of the plurality of images to perform a blur analysis on by predicting which of the plurality of images of the subject are least likely blurred images or low contoured images based on the mapping of the readings of the acceleration recorded at the timestamps associated with the respective ones of the plurality of images of the subject by,
determining which of the readings of acceleration from the accelerometer are a lowest reading of acceleration after capturing the burst of the plurality of images,
determining the timestamp associated with the lowest reading of acceleration, and
determining the least likely blurred images or the low contoured images as ones of the plurality of images having a same timestamp as the timestamp associated with the lowest reading of acceleration;
check only the least likely blurred images or the low contoured images for recognizability from among the plurality of images by performing the blur analysis on only the least likely blurred images or the low contoured images among the plurality of images to generate a blur value and comparing the blur value with a threshold selected based on a maximum amount of blur that can be reliably recognized via optical character recognition (OCR); and
selectively upload the least likely blurred images or the low contoured images of the subject to the server based on results of the checking such that only a subset of the plurality of images captured by the mobile device during the burst are uploaded to the server for the server to perform the OCR thereon.

9. The system of claim 8, wherein at least all but one of the plurality of images are captured automatically, without a user doing anything more than is required to capture one of the plurality of images.

10. The system of claim 8, wherein the system is configured to predict which of the plurality of images are the least likely blurred images.

11. The system of claim 8, wherein the system is configured to predict which of the plurality of images are the likely low contoured images.

12. The system of claim 8, wherein the system is configured to
the predicting which of the plurality of images of the subject are the least likely blurred images or the low contoured images is based on the readings of the acceleration from the accelerometer, and
the system is configured to perform the check by performing the blur analysis subsequent to the predicting based on transforming the least likely blurred images or the low contoured images to a frequency domain.

13. The system of claim 12, wherein the transforming the least likely blurred images or the low contoured images to the frequency domain utilizes a Fast Fourier Transform (FFT).

14. The system of claim 8, wherein the mobile device is configured to perform a two-step process with the predicting being a first step of the two-step process performed on the plurality of images and the check being a second step of the two-step process by performing the blur analysis on the least likely blurred images or the low contoured images, which are the subset of the plurality of images.

15. A non-transitory computer readable medium having computer readable program code embodied therein for uploading at least one of a plurality of images of a subject from a mobile device to a server, the computer readable program code configured to cause a computer system to:
record readings of acceleration from an accelerometer of the mobile device while capturing the plurality of images of the subject in succession in a burst using a camera of the mobile device;
map the readings of the acceleration from the accelerometer with respective ones of the plurality of images of the subject by correlating timestamps associated with the plurality of images of the subject with timestamps associated with the readings of the acceleration from the accelerometer;
narrow which of the plurality of images to perform a blur analysis on by predicting which of the plurality of images of the subject are least likely blurred images or low contoured images based on the mapping of the readings of the acceleration recorded at the timestamps associated with the respective ones of the plurality of images of the subject by,
determining which of the readings of acceleration from the accelerometer are a lowest reading of acceleration after capturing the burst of the plurality of images,
determining the timestamp associated with the lowest reading of acceleration, and
determining the least likely blurred images or the low contoured images as ones of the plurality of images having a same timestamp as the timestamp associated with the lowest reading of acceleration;
check only the least likely blurred images or the low contoured images for recognizability from among the plurality of images by performing the blur analysis on only the least likely blurred images or the low contoured images among the plurality of images to generate a blur value and comparing the blur value with a threshold selected based on a maximum amount of blur that can be reliably recognized via optical character recognition (OCR); and selectively upload the least likely blurred images or the low contoured images of the subject to the server based on results of the checking such that only a subset of the plurality of images captured by the mobile device during the burst are uploaded to the server for the server to perform the OCR thereon.

16. The non-transitory computer readable medium of claim 15, wherein at least all but one of the plurality of images are captured by the mobile device automatically, without a user doing anything more than is required to capture one of the plurality of images.

17. The non-transitory computer readable medium of claim 15, wherein the computer system is configured to predict which of the plurality of images are the least likely blurred images.

18. The non-transitory computer readable medium of claim 15, wherein the computer system is configured to predict which of the plurality of images are the likely low contoured images.

19. The non-transitory computer readable medium of claim 15, wherein the predicting which of the plurality of images of the subject are the least likely blurred images or the low contoured images based on the readings of the acceleration from the accelerometer, and the computer system is configured to perform the check by performing the blur analysis subsequent to the predicting based on transforming the least likely blurred images or the low contoured images to a frequency domain.

20. The non-transitory computer readable medium of claim 19, wherein the transforming the least likely blurred images or the low contoured images to the frequency domain utilizes a Fast Fourier Transform (FFT).

21. The non-transitory computer readable medium of claim 15, wherein the mobile device is configured to perform a two-step process with the predicting being a first step of the two-step process performed on the plurality of images and the check being a second step of the two-step process by performing the blur analysis on the least likely blurred images or the low contoured images, which are the subset of the plurality of images.

* * * * *